United States Patent [19]
Hayakawa et al.

[11] Patent Number: 5,949,040
[45] Date of Patent: Sep. 7, 1999

[54] TURN SIGNAL SWITCH

[75] Inventors: Hiroshi Hayakawa; Atsuo Takahashi, both of Miyagi-ken, Japan

[73] Assignee: Alps Electric Co., Ltd., Ota-ku, Japan

[21] Appl. No.: 09/045,337

[22] Filed: Mar. 20, 1998

[30] Foreign Application Priority Data

Mar. 21, 1997 [JP] Japan ................................. 9-068273

[51] Int. Cl.⁶ ................................................. H01H 25/00
[52] U.S. Cl. .................. 200/61.34; 200/61.3; 200/61.35
[58] Field of Search ............... 200/4, 61.27, 61.3–61.35, 200/61.54, 332, 335

[56] References Cited

U.S. PATENT DOCUMENTS

| | | | |
|---|---|---|---|
| 4,503,296 | 3/1985 | Iwata et al. .......................... | 200/61.27 |
| 4,855,542 | 8/1989 | Furuhashi et al. ................... | 200/61.27 |
| 5,313,028 | 5/1994 | DuRocher ............................ | 200/61.27 |
| 5,385,067 | 1/1995 | Wiersing et al. ..................... | 74/484 R |
| 5,575,177 | 11/1996 | Poleschuk et al. ................... | 74/484 R |
| 5,708,243 | 1/1998 | Karasik et al. ...................... | 200/61.54 |

*Primary Examiner*—Michael Friedhofer
*Attorney, Agent, or Firm*—Brinks Hofer Gilson & Lione

[57] ABSTRACT

A switch lever is rotatably supported on first and second cases and is held in one of three positions of right and left ON positions and neutral position by cooperation of a cam face formed on the first case with an actuator provided on the switch lever. On the inside bottom surface of the second case, first and second support pins are provided upright. A first lever member is rotatably supported on the first support pin and a second lever member is rotatably supported on a support pin formed upright on the forward end of the first lever member. In the second lever member are formed first and second long holes, in which the support pin and the second support pin are fitted. A torsion spring is provided to press the second lever member in the longitudinal direction of these long holes. When the switch lever is turned to right or left turn position, the second lever member is moved forward into the path of rotation of a cancel projection by the force of the torsion spring, turning the second lever member. The first lever member is turned in interlock with the second lever member, thereby automatically returning the switch lever to neutral position.

5 Claims, 6 Drawing Sheets

FIG. 7

TURN SIGNAL SWITCH

BACKGROUND OF THE INVENTION

1. Field of the Invention

The present invention relates to a turn signal switch for use as a direction indicator mounted on a steering column of automotive vehicles, and more particularly to a turn signal cancellation mechanism for automatically returning a turn signal switch lever to its neutral position.

2. Description of the Related Art

A turn signal switch on automotive vehicles is rotatably supported at the base end side on a housing which is formed integrally with the steering column, and is so designed as to turn on and off the left or right turn signal lamp by turning the top end of the switch lever in either direction of right or left turn from neutral position. In this turn signal switch, a cam is mounted on the inner surface on the housing side, and an actuator which is engaged with this cam is mounted on the switch lever side through a spring, to thereby hold the switch lever in one of the three positions: right and left turn and neutral positions. Also, there is provided a turn signal cancellation mechanism for automatically canceling the switch lever back to neutral position from either the right or left turn position when the steering wheel is turned in the reverse direction of indication.

As a turn signal cancellation mechanism, there has been adopted a cancel lever, which is rotatably and longitudinally movably supported on a housing. In this canceling mechanism a projection provided on one end of the cancel lever is engaged in a cam hole provided on the switch lever side, and a spring member is mounted to elastically press the other end of the cancel lever towards protruding out of the housing.

In the turn signal switch of rough constitution described above, the switch lever, when in neutral position, is locked in the neutral position with an actuator engaged with the center of the cam provided on the housing. In this case, since the projection is engaged with the crest of the cam hole, the cancel lever is in a retreat position and the forward end of the cancel lever is off the path of rotation of a cancel projection provided on a rotor which rotates in interlock with the steering wheel. In this state, therefore, the cancel projection will not contact the cancel lever if the steering wheel is turned.

In the meantime, when the switch lever is turned from neutral position to the right or to the left, the actuator moves from the center of the cam to either the right or left lock, thereby locking the switch lever in a specific turn signal position and accordingly blinking the right or left turn signal lamp. In this case, the cancel lever projection moves from the crest to the valley portion of the cam hole, being pressed forwardly by the spring member until the forward end of the cancel lever is projected out into the path of rotation of the cancel projection. In this state, when the steering wheel is turned in the reverse direction of the turn signal, the cancel lever contacts the cancel projection and turns during the return operation. Consequently, as the cancel lever projection contacts and pushes the end of the cam hole, the actuator comes off the lock of the cam, thus moving to the steady position at center, and the switch lever turns in the reverse direction of turn signal, being self-cancelled to neutral position.

The aforesaid conventional turn signal switch is constituted so that the switch lever locked in a turn signal position will be automatically returned to neutral position by a driving force from the cancel lever which is turned by the cancel projection. Since a relatively great locking force is set to lock the switch lever in the turn signal position in order that undesired automatic return of the switch lever to neutral position with vibration or other can be prevented, the cancel lever needs a great driving force to cancel the switch lever. On the hand, the cancel lever is operated by the cancel projection which turns in interlock with the steering wheel. Therefore, there exists a limit to the range of angle at which the cancel projection contacts the forward end of the cancel lever. It is, therefore, necessary to largely turn to displace the rear end side of the cancel lever within the limited angle of contact to produce a canceling force.

However, the driving force produced at the cancel lever and the amount of rotational displacement of the cancel lever are in a mutually contradictory relation; for instance, when the support of rotation of the cancel lever is moved close to the rear end side, a great driving force is generated at the rear end side of the cancel lever, while the amount of displacement of the cancel lever becomes smaller. Contrarily to this, when the support of rotation of the cancel lever is brought close to the forward end side, the amount of rotational displacement of the cancel lever increases, while the driving force generated at the rear end side of the cancel lever decreases. The position of support of rotation is set so that the amount of rotational displacement of the cancel lever will increase by slightly sacrificing a decrease in the cancel lever driving force. In this case, it becomes necessary to decrease the lock retaining force of the switch lever with the decrease in the driving force of the cancel lever, resulting in possible malfunction of the switch lever. Where the lock retaining force cannot be reduced, the cancel lever and the cancel projection will be subject to abrasion and breakage, resulting in unsatisfactory canceling function.

SUMMARY OF THE INVENTION

In the present invention, the cancel lever is comprised of two members: a first lever member which is rotatably supported on the housing through a pivot shaft, and a second lever member which is rotatably supported on the housing and the first lever member through long holes. The forward end of the second lever member is turned by the cancel projection, and also the first lever member is turned in interlock with the second lever member, thus turning the first lever member to allow the switch lever to automatically return to neutral position. In the case of the above-described cancel lever comprised of these two members, the leverage of the first and second lever members can freely be set and therefore both the driving force and the amount of rotational displacement required by the first lever can be increased.

The turn signal switch of the present invention includes a housing having a cam portion, a switch lever rotatably supported on the housing, an actuator operating in cooperation with the cam portion to hold the switch lever in one of three positions: first and second positions and neutral position, a first lever member rotatably supported on the housing through a pivot for returning the switch lever from the first and second positions to neutral position, a second lever member rotatably supported on the first lever member and the housing through long holes, and a spring member for elastically pressing the second lever member in the longitudinal direction of each of the long holes, so that the second lever member is withdrawn to the outside of the path of rotation of the cancel projection which turns in interlock with the steering wheel when the switch lever is in neutral position, and also the second lever member is moved into the path of rotation of the cancel projection by the force of the spring member when the switch lever is in the first or second position.

Also when the switch lever is fitted with a rotating member having an engaging portion which can be engaged with, and released from, the first lever member, and the rotating member is pressed by a return spring so as to automatically return to the center position, the rotation of the first lever member is absorbed by the rotating member rotating against the return spring if the driver makes canceling operation while holding the switch lever in an ON position, thereby preventing giving damage to component parts of a power transmission system including these two levers and the engaging portion.

Also when the first lever is provided with a deflecting portion capable of deflecting in the direction of rotation of the first lever member, the same effect as described above can be obtained without using the rotating member and the return spring because the deflecting portion of the first lever member deflects even if the driver makes the canceling operation while holding the switch lever in the ON position.

BRIEF DESCRIPTION OF THE DRAWINGS

The present invention may be further understood by reference to the drawings, wherein.

DESCRIPTION OF THE PREFERRED EMBODIMENT

Figure 1:
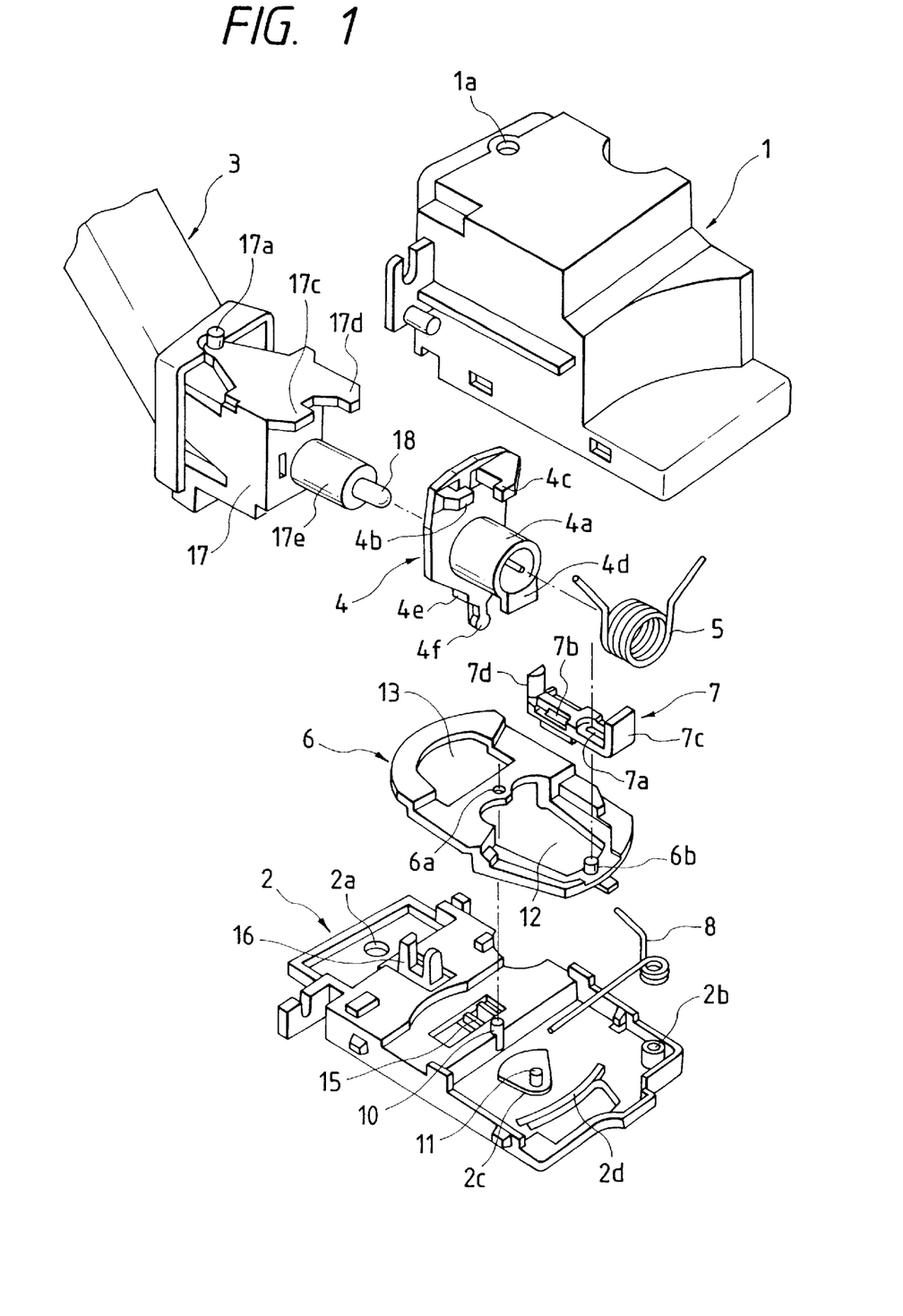
FIG. 1 is an exploded perspective view of an embodiment of a turn signal switch.
Figure 2:
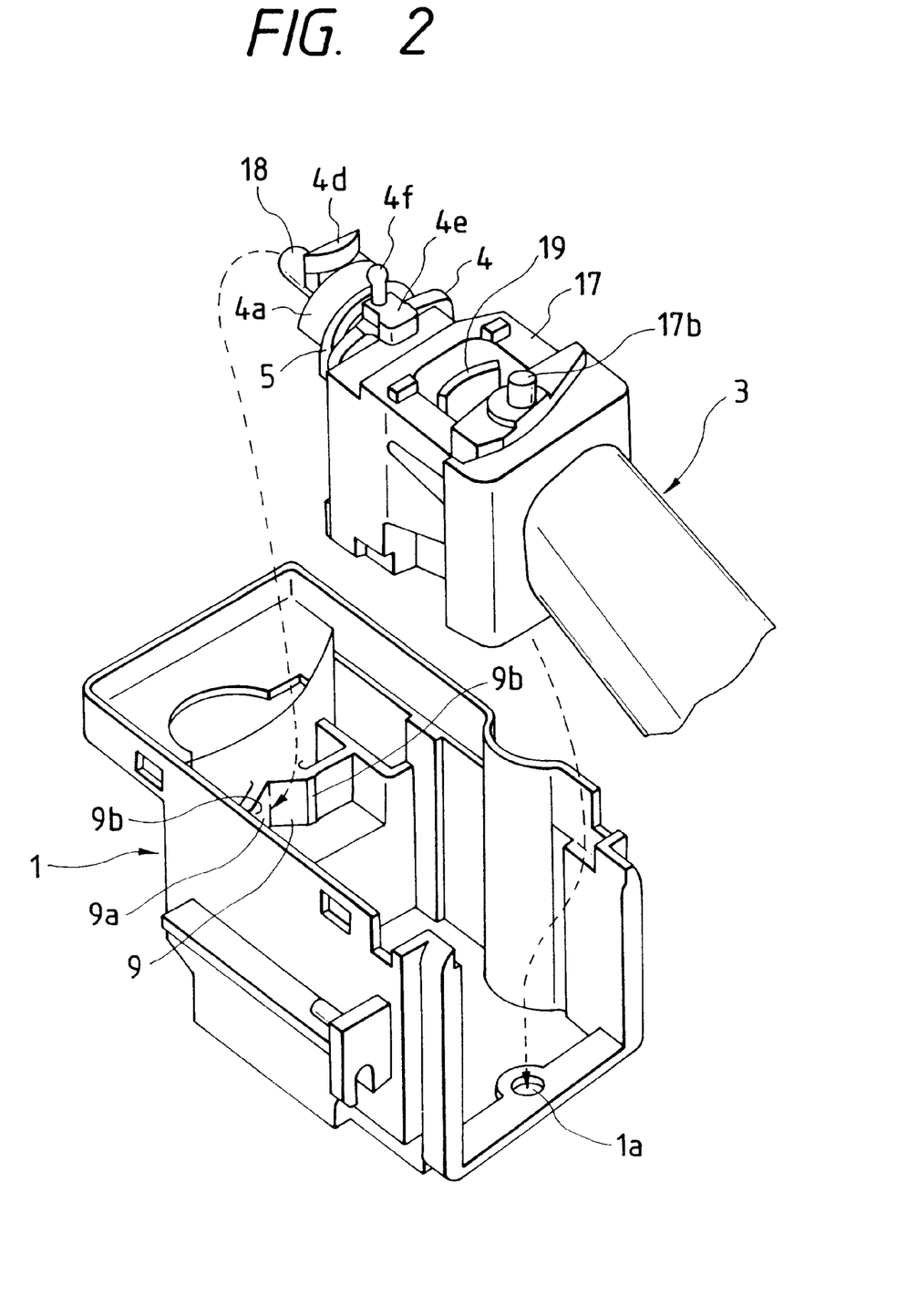
FIG. 2 is a perspective view showing the turn signal switch and a switch lever to be assembled to a first case.
Figure 3:
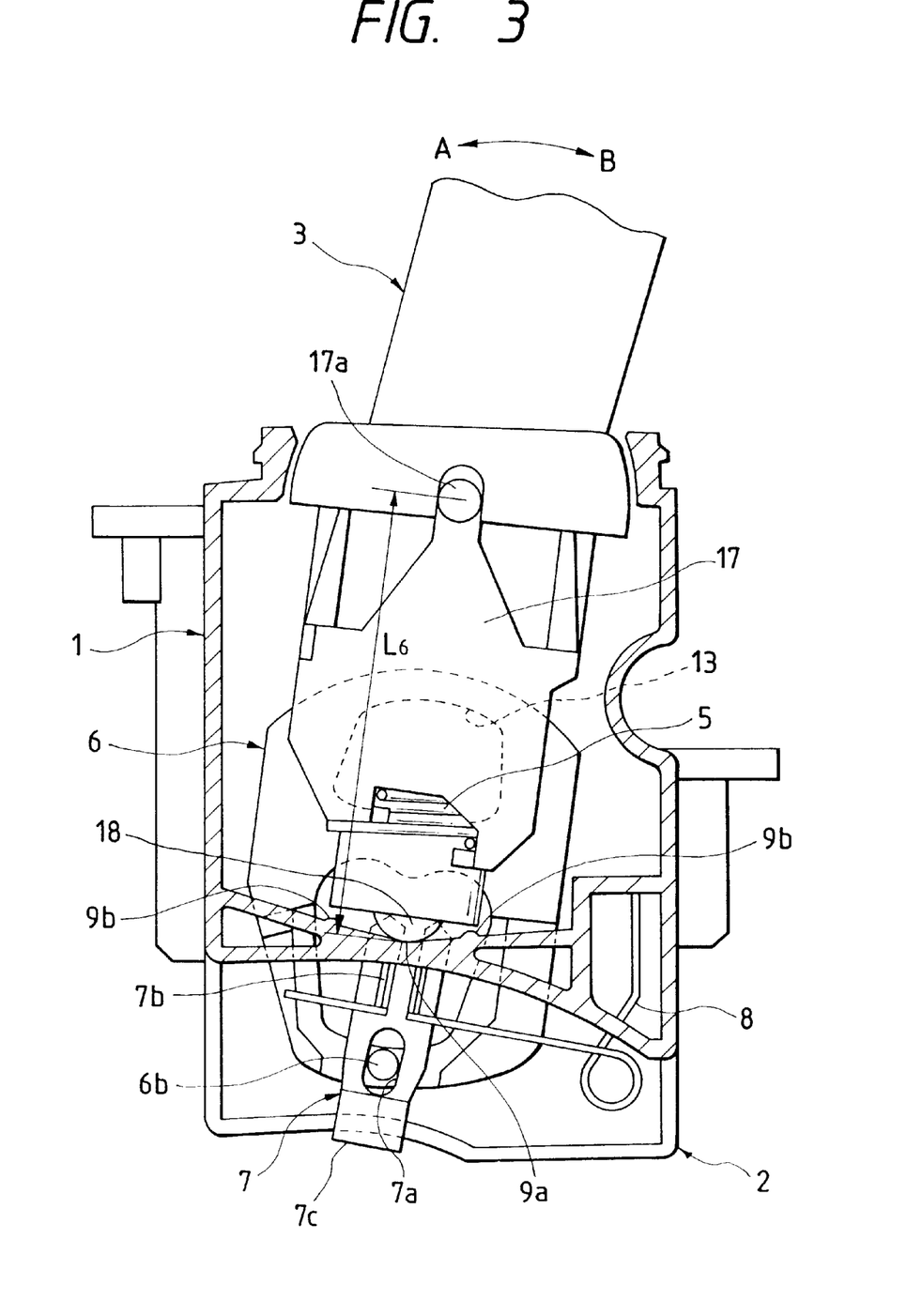
FIG. 3 is a cross sectional view of the turn signal switch.
Figure 4:
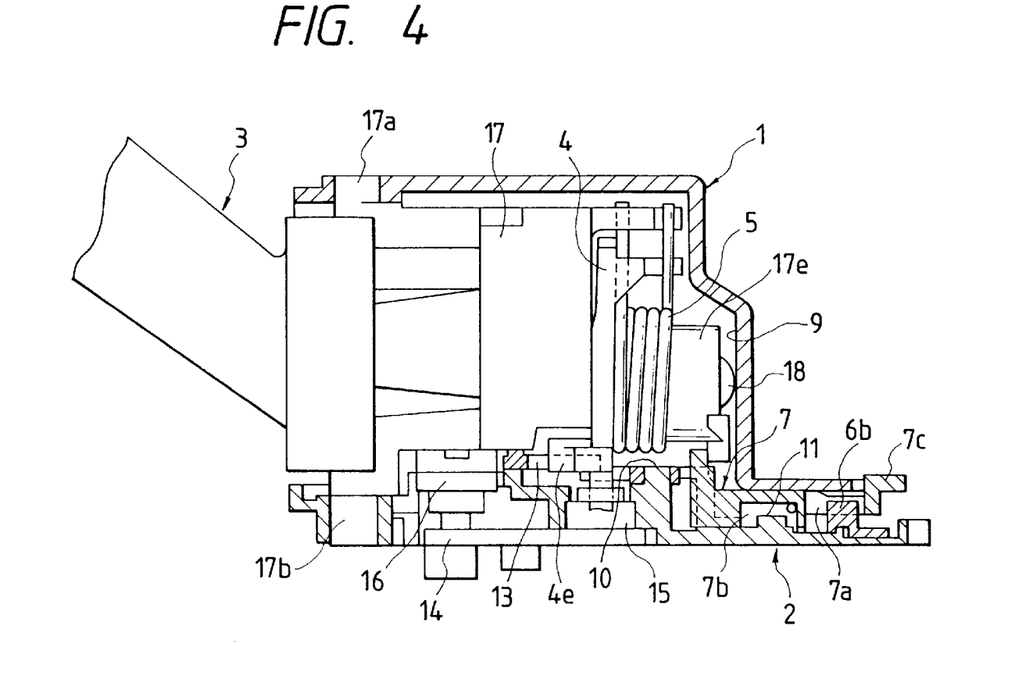
FIG. 4 is a longitudinal sectional view of the turn signal switch.
Figure 5:
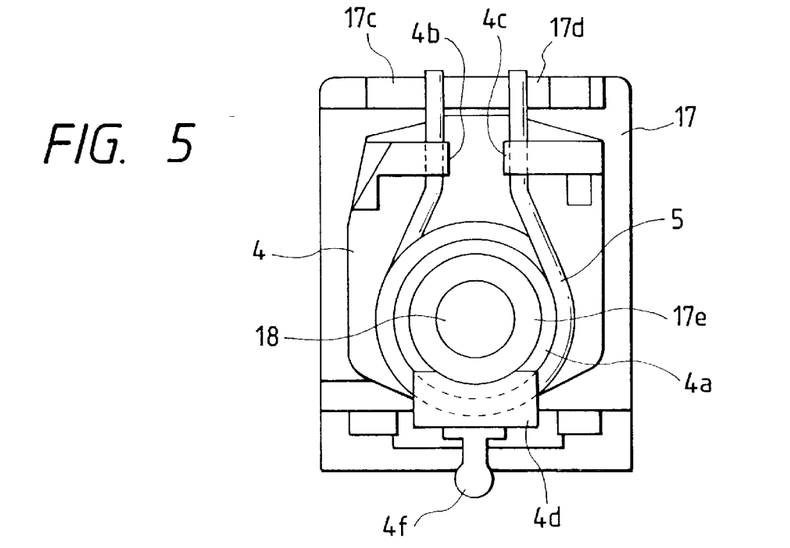
FIG. 5 is a front view of a rotating member of the turn signal switch.

The preferred embodiment of a turn signal switch of the present invention will be explained with reference to the accompanying drawings. FIG. 1 is an exploded perspective view of the preferred embodiment of the turn signal switch; FIG. 2 is a perspective view showing the turn signal switch and a switch lever to be installed to a first case; FIG. 3 is a cross sectional view of the turn signal switch; FIG. 4 is a longitudinal sectional view of the turn signal switch; FIG. 5 is a front view of a rotating member to be used in the turn signal switch; and FIG. 6 is an explanatory view showing canceling operation of the turn signal switch.

As shown in FIG. 1, the turn signal switch of the present embodiment is comprised chiefly of first and second cases 1 and 2 mutually jointed and integrated into a housing, a switch lever 3 rotatably supported on these cases 1 and 2, a rotating member 4 rotatably supported on the switch lever 3, a return spring 5 for automatically returning the rotating member 4 to the center position, first and second lever members 6 and 7 mounted on the upper surface of the second case 2, and a torsion coil spring 8 for elastically pressing the second lever member 7 in a direction in which the second lever member is protruded out of the second case 2. The first and second cases 1 and 2 are designed to be secured to a stator member of unillustrated column cover and combination switch.

In the first case 1 a V-shaped cam face 9 is formed as shown in FIGS. 2 to 4. The cam face 9 has a valley portion 9a at center and protruding lock portions 9b on both sides. The first case 1 and the second case 2 are integrally formed by such a means as snap connection. In these cases 1 and 2 are formed holes 1a and 2a respectively which serve as supports for rotation of the switch lever 3. On the inside bottom surface of the second case 2 a first support pin 10 and a second support pin 11 are uprightly formed at a predetermined spacing. On the first support pin 10 the first lever member 6 is rotatably supported. In the first lever member 6 are formed a first through hole 12 and a second through hole 13; between these through holes 12 and 13 is formed a hole 6a, in which the first support pin 10 is inserted. On the first lever member 6, a support pin 6b is uprightly formed. The second lever member 7 is rotatably supported on this support pin 6b.

In the second lever member 7 are formed a first long hole 7a in which the support pin 6b is fitted, and a second long hole 7b in which the second support pin 11 is fitted. These two long holes 7a and 7b are on the same line in the longitudinal direction. Also, at the front and rear ends of the second lever member 7, a contact portion 7c and a cam portion 7d are uprightly provided. The cam portion 7d has a semi-circular cross sectional form. On the second lever member 7 one end of the torsion coil spring 8 is engaged, so that the second lever member 7 is elastically pressed by the torsion coil spring 8 in the longitudinal direction of the long holes 7a and 7b. The coil portion of the torsion coil spring 8 is inserted over a boss 2b provided uprightly on the inside bottom surface of the second case 2. The other end of the torsion coil spring 8 is retained on the side wall of the second case 2. On the inside bottom surface of the second case 2, a step 2c and a rib 2d are formed in contact with the bottom surface of the second lever member 7, and contact resistance between the second case 2 and the second lever member 7 is reduced by the step 2c and the rib 2d.

On the bottom surface of the second case 2 there is attached a printed-circuit board 14. A pair of slider receiving members 15 and 16 which slide on the printed-circuit board 14 are exposed to the inside bottom surface side of the second case 2. The slider receiving member 15 is movable in the lateral direction of the second case 2. As the switch lever 3 is moved to a right or left turn position, the slider receiving member 15 is driven to flash an unillustrated right or left turn signal lamp. The other slider receiving member 16 is movable in the longitudinal direction of the second case 2. With the upward movement of the switch lever 3, the slider receiving member 16 is driven to turn on a lamp of an unillustrated beam. On these slider receiving members 15 and 16 are attached moving contacts (not illustrated) which move to and from stationary contacts formed on the printed-circuit board 14.

The switch lever 3 is fitted with a holder 17. On both the upper and lower surfaces of the holder 17 are provided support pins 17a and 17b which protrude to fit in the holes 1a and 2a. The switch lever 3 and the holder 17 are designed to turn as one body in a horizontal direction around a straight line as an axis of rotation connecting the holes 1a and 2a (the support pins 17a and 17b), and also are so connected as to swing vertically by a predetermined angle with respect to the holder 17. On the upper surface of the holder 17 are formed a pair of spring retaining portions 17c and 17d. A tubular portion 17e is formed on the front surface of the holder 17. In the tubular portion 17e an actuator 18 is slidably held. The tip of this actuator 18 is constantly held in contact with the cam face 9 of the first case 1 by an unillustrated spring.

As shown in FIG. 5, a tubular body 4a formed on the rotating member 4 is inserted over a tubular portion 17e; the rotating member 4 is rotatably held on the holder 17, using the tubular portion 17e as a guide surface. In the upper part of the rotating member 4, a pair of spring retaining portions 4b and 4c are formed. Both ends of the return spring 5 wound on the tubular portion 4a are retained by the spring retaining portions 4b, 4c and by the spring retaining portions 17c, 17d of the holder 17, thereby constantly pressing the rotating member 4 towards the center position. From the lower end of the tubular portion 4a a cam portion 4d having a semi-circular cross sectional form extends downwardly. The cam portion 4d is disposed in the opposite position of the cam portion 7d of the second lever member 7. Furthermore, the rotating member has, on the lower end thereof, a driving portion 4e, which is vertically formed to reach the inside of the second through hole 13 of the first lever member 6. From the driving portion 4e a projection 4f extends downwardly to engage with one slider receiving member 15 previously stated. On the lower end of the switch lever 3, a projection 19 is formed in engagement with the other slider receiving member 16 previously stated as shown in FIG. 2.

Figure 6A:
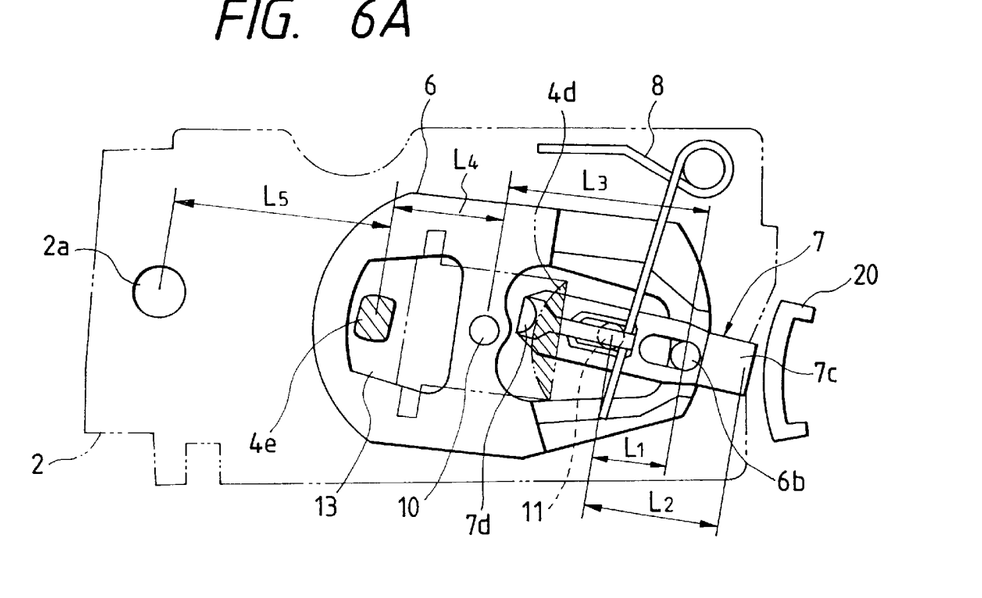
FIG. 6a and 6b are explanatory views showing canceling operation of the turn signal switch.

Next, operation of the turn signal switch thus constituted will be described by referring chiefly to FIG. 6. First, as shown in FIG. 3, when the switch lever 3 is in neutral position, the tip of the actuator 18 is in contact with the valley portion 9a formed at the center of the cam face 9, and is stably held in position by the elasticity of an unillustrated spring. At this time, as shown in FIG. 6A, the cam portion 4d of the rotating member 4 and the cam portion 7d of the second lever member 7 contact each other at the crests thereof; the second lever member 7 has been retreated against the force of the torsion coil spring 8. Therefore, a contact portion 7c of the second lever member 7 is positioned out of the path of rotation of a cancel projection 20 provided on the rotor which rotates in interlock with the steering wheel. If the steering wheel is turned in this state, the cancel projection 20 will not contact the contact portion 7c of the second lever member 7, and therefore the switch lever 3 is kept in neutral position.

When the switch lever 3 is turned from the neutral position in a direction of either the arrow A or B in FIG. 3, the tip of the actuator 18 goes over the slope of the cam face 9, being locked to be held in position with stability by the lock 9b. For example, when the switch lever 3 is turned in the direction of the arrow B in FIG. 3, the rotating member 4 rotates in interlock with the switch lever 3, and the cam portion 4d and the driving portion 4e both indicated by hatching in FIG. 6 move from the positions in FIG. 6A to the positions in FIG. 6B. Consequently, the cam portion 4d of the rotating member 4 moves off the crest of the cam portion 7d of the second lever member 7, and the second lever member 7 is advanced by the elastic force of the torsion coil spring 8 along the longitudinal direction of the long holes 7a and 7b, thus moving the contact portion 7c into the path of rotation of the cancel projection 20. Also with the rotation of the switch lever 3 in the direction of the arrow B, the projection 4f provided on the lower end of the rotating member 4 moves horizontally the slider receiving member 15, which in turn changes over the contact points, thereby blinking an unillustrated right turn signal lamp.

Figure 6B:
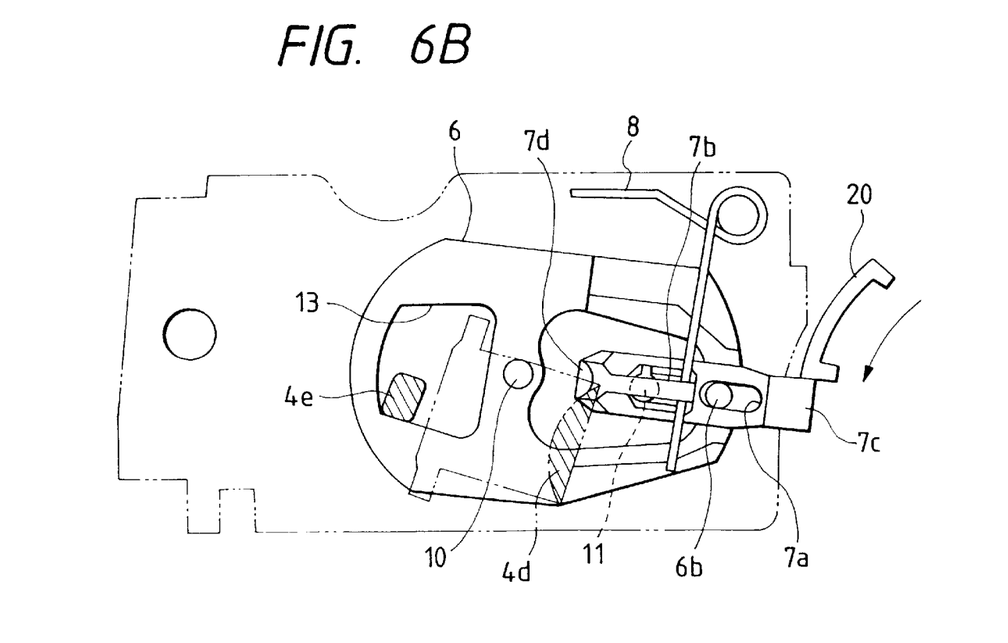

When the steering wheel is turned in a reverse direction (in the direction of the arrow in FIG. 6B) from the right turn state shown in FIG. 6B, the cancel projection 20 hits the contact portion 7c of the second lever member 7 during a return stroke. As a result, the second lever member 7 turns clockwise in the same figure on the center of the second support pin 11 and with this rotation the first lever member 6 having the support pin 6b which engages with the first long hole 7a turns clockwise on the center of the first support pin 10. The second through hole 13 of the first lever member 6, therefore, turns to move upwardly in the same figure. Thus the peripheral edge of the second through hole 13 pushes upwardly the driving portion 4e of the rotating member 4. The actuator 18, therefore, comes off the lock portion 9b of the cam face 9, moving to the valley portion 9a at center to thereby automatically return the switch lever 3 and the first and second lever members 6 and 7 to neutral position shown in FIG. 6A. Now, let $L_1$ be a distance between the support pin 6b and the second support pin 11, $L_2$ be a distance between the contact portion 7c and the second support pin 11, $L_3$ be a distance between the support pin 6b and the first support pin 10, $L_4$ be a distance between the first support pin 10 and the driving portion 4e, $L_5$ be a distance between the driving portion 4e and the hole 2a (center of rotation of the switch lever 3), and $L_6$ be a distance between the support pin 17a (hole 2a) and the lock portion 9b (see FIG. 3), and the cancellation ratio Pi (a ratio of the driving force produced in the lock portion 9b of the cam face 9 to a force generated at the cancel projection 20 which is 1) can be expressed by $$Pi=(L_2/L_1)\times(L_3/L_4)\times(L_5/L_6) \tag{1}$$

When the driver turns the steering wheel in a reverse direction while holding the switch lever 3 in the right turn position as shown in FIG. 6B, the driving portion 4e of the rotating member 4 is pressed by the peripheral edge of the second through hole 13 as described above; however, the switch lever 3, being pressed, will not automatically return. In this case, the rotating member 4 rotates on the peripheral surface of the tubular portion 17c against the return spring 5. Then, when the cancel projection 20 passes the contact portion 7c of the second lever member 7, the rotating member 4 is automatically returned by the return spring 5 to the center position of the holder 17, thereby being held again in the right turn position shown in FIG. 6B. With the canceling operation, the first lever member 6 is rotated. The rotation of the first lever member 6, however, is absorbed by the rotation of the rotating member 4; therefore component parts of the power transmission system including both levers 5 and 6 and the driving portion 4e can be prevented from damage.

When the steering wheel is further turned to steer to the right with the turn signal switch in the right turn state shown in FIG. 6B, the cancel projection 20 turns in the reverse direction of the arrow in the figure to contact the contact portion 7c of the second lever member 7; the second lever member 7 and the first lever member 6 rotate counterclockwise, or in the reverse direction of canceling operation. In this case, the cam portion 7d of the second lever portion 7 smoothly rotates sliding on the peripheral surface of the cam portion 4d of the rotating member 4, and the first lever member 6 turns to shift in a direction in which the peripheral edge of the second through hole 13 moves away from the driving portion 4e. The switch lever 3, therefore, does not return to neutral position, but is held in the right turn position.

Figure 7:
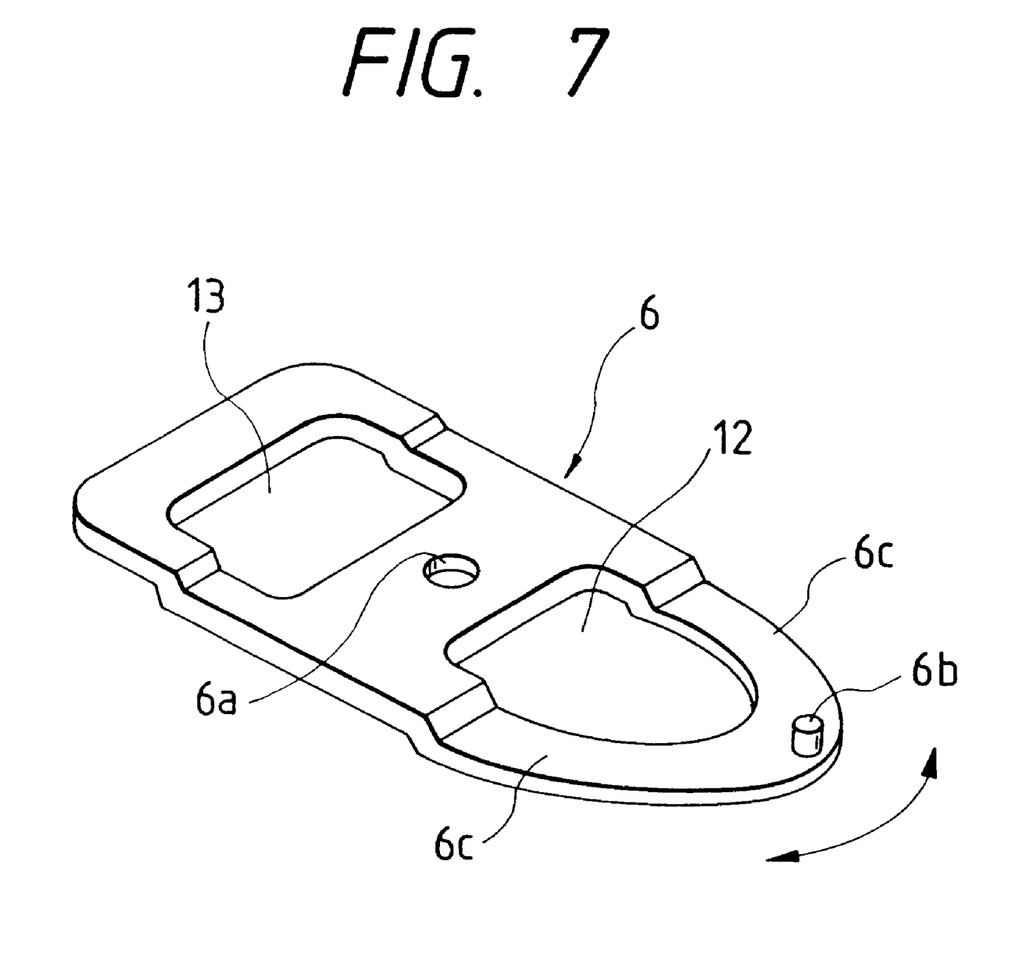
FIG. 7 is a perspective view showing a modified example of a first lever member.

FIG. 7 is a perspective view showing a modification of the first lever member 6. A thin deflecting portion 6c is formed around the first through hole 12 of the first lever member 6. The deflecting portion 6c deflects in the direction of the arrow in the figure when an excess turning force acts on the first lever member 6. Forming the deflecting portion 6c on the first lever member 6 as stated above can perform the canceling operation while holding the switch lever 3 in the ON position if the rotating member 4 and the return spring 5 used in the above-described embodiment are dispensed with. That is, when the steering wheel is turned reversely while the switch lever 3 is held in the right or left turn position, the deflecting portion 6c deflects at the time when the driving portion 4e of the rotating member 4 is pushed by the peripheral edge of the second through hole 13 of the first lever member 6, thereby preventing excessive pressure application to the driving portion 4e.

The turn signal switch embodying the present invention as hitherto described has the following advantages.

The turn signal switch is comprised of the housing having the cam portion, the switch lever rotatably supported on the housing, the actuator holding the switch lever in three positions including the first, second and neutral positions in cooperation with the cam portion, the first lever member rotatably supported on the housing via the support pin for returning the switch lever from the first and second positions to neutral position, the second lever member rotatably supported on the first lever member and the housing through the long holes, and the spring member for elastically pressing the second lever member in the longitudinal direction of each long hole. In the turn signal switch thus constituted, as the second lever member is retreated by operating the switch lever from neutral position, out of the path of rotation of the cancel projection which rotates in interlock with the steering wheel, the second lever member is advanced into the path of rotation of the cancel projection by the force of the spring member from the first or second ON position. According to the constitution, the leverage of the first and second lever members can freely be set and therefore it is possible to increase both the driving force and the amount of rotational displacement required by the first lever member.

Since the switch lever is provided with a rotating member having an engaging portion which can be moved into, and away from, engagement with the first lever member, and also the rotating member is pressed by a return spring to automatically return to the center position, it is possible to prevent giving damage to component parts of the power transmission system including both levers and engaging portions because the rotation of the first lever member is absorbed by the rotation of the rotating member against the return spring even if the driver makes canceling operation while holding the switch lever in a turn signal ON position.

When the first lever member is provided with the deflecting portion which can deflect in the direction of rotation, a similar effect can be obtained without using the aforementioned rotating member and return spring because the deflecting portion of the first lever member deflects if the driver makes the canceling operation while holding the switch lever in the ON position.

What is claimed is:

1. A turn signal switch having a switch lever operated into a right or a left latched position or released therefrom into a neutral position by a return rotation of a steering wheel, comprising:

(a) a cam face for holding said switch lever in said latched position;

(b) a first lever member having an effort point, an action point acting on said switch lever and a fulcrum around which said first lever member is rotated by the application of a force at said effort point to thereby release said switch lever from said latched position into said neutral position;

(c) a second lever member having an effort point, an action point acting at the effort point of said first lever member and a fulcrum around which said second lever member is rotated by the application of a force at said effort point thereof to thereby rotate said first lever member; and (d) a cancel projection acting at the effort point of said second lever, said cancel projection rotating in concurrence with the return rotation of said steering wheel to thereby rotate said second lever member.

2. A turn signal switch according to claim 1, wherein said switch lever is fitted for rotation therearound with a rotating member on which the action point of the said first lever member acts so as to rotate said rotating member around said switch lever, and said turn signal switch further comprises a return spring for urging said rotating member to stay circumferentially with said switch lever, said rotating member being rotatable around said switch lever within a limited angle against an urging force of said return spring.

3. A turn signal switch according to claim 1, wherein said first lever member has a deflecting portion which can be deflected in the direction in which said first lever member rotates.

4. A turn signal switch according to claim 1, wherein said second lever member is movable between a first position where said action point thereof interferes with the rotation of said cancel projection and a second position where said action point thereof is clear from the rotation of said cancel projection, and said turn signal switch further comprises a positioning device for positioning said second lever member in said first position when said switch lever is in said latched position and positioning the second lever member in said second position when said switch lever is in said neutral position.

5. A turn signal switch according to claim 4, wherein said positioning device includes a spring member for urging said second lever member toward said first position and a cam mechanism for allowing said second member to move into said first position by an urging force of said spring member when said switch lever is in said right or left latched position and pulling said second member into said second position against the urging force of said spring member when said switch lever is in said neutral position.

* * * * *